April 29, 1969
J. R. REEVES ET AL
3,441,745
APPARATUS FOR FREQUENCY AND PHASE COMPARISON OF TWO PERIODIC SIGNALS
Filed April 30, 1965

United States Patent Office 3,441,745

Patented Apr. 29, 1969

3,441,745

APPARATUS FOR FREQUENCY AND PHASE COMPARISON OF TWO PERIODIC SIGNALS

John R. Reeves, Billericay, and David Charles Sanders, Romford, England, assignors to The Plessey Company Limited, Ilford, England, a British company Filed Apr. 30, 1965, Ser. No. 452,149
Claims priority, application Great Britain, May 7, 1964, 19,090/64
Int. Cl. H02j 3/00
U.S. Cl. 307—87 4 Claims

ABSTRACT OF THE DISCLOSURE

Apparatus for the frequency and phase comparison of two periodic signals including means for producing two pulse trains, each corresponding in frequency and phase to one of the periodic input signals, the pulses of the two pulse trains having the same fixed duration irrespective of the periodic input signals, a coincidence gate to which the two pulse trains are applied and which affords an output pulse whenever a pulse in one train overlaps a pulse in the other pulse train, a first scaler circuit to which the said output pulse is fed, the first scaler circuit delivering an output pulse whenever it reaches a position corresponding to its maximum stored count and capable of being reset to its initial or zero count by means of a reset pulse, and a second scaler circuit having a division factor greater than that of the first scaler circuit, said second scaler circuit being fed from one of said periodic pulse trains and effective for affording a reset pulse for resetting the first scaler circuit.

This invention relates to apparatus for the frequency and phase comparison of two periodic signals, for example for use in detecting synchronisation in two electrical generators that require to be connected in parallel.

According to a feature of the invention, the apparatus includes means for producing two pulse trains, each corresponding in frequency and phase to one of the periodic input signals, the pulses of the two trains having the same fixed duration, and a coincidence gate to which the two pulse trains are applied and which supplies an output pulse to a scaler circuit whenever a pulse in one train overlaps a pulse in the other train, the scaler circuit delivering an output pulse whenever it reaches the position corresponding to its maximum stored count and capable of being reset to its initial or zero count state by a reset pulse obtained from one of the input pulse trains through a second or reset scaler having a division factor one greater than that of the first or output scaler.

Figure 1:
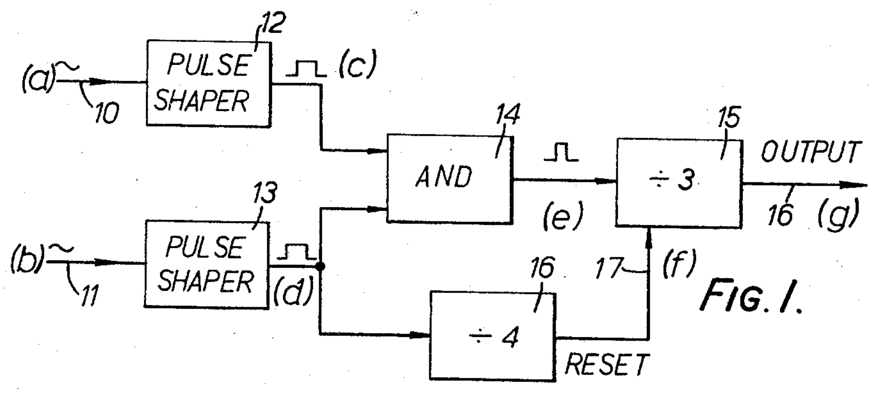

Other features of the invention will be evident from the following description of a frequency and phase comparison apparatus embodying the preferred form of the invention. The description refers to the drawing accompanying the specification in which FIGURE 1 shows a block diagram of the apparatus, and FIGURE 2 shows electrical voltage or current waveforms occurring at points marked (*a*) to (*g*) in FIGURE 1.

The apparatus shown in the drawing is arranged to be responsive to the occurrence of frequency and phase synchronism, within certain defined limits, of a pair of input signals applied to the apparatus over input lines 10 and 11 respectively. For the purpose of this description it is assumed that the input signals on lines 10 and 11 are sinusoidal alternating currents, derived for example from a pair of rotating generators which are to be brought into synchronism so that they can be operated in parallel.

Figure 2:
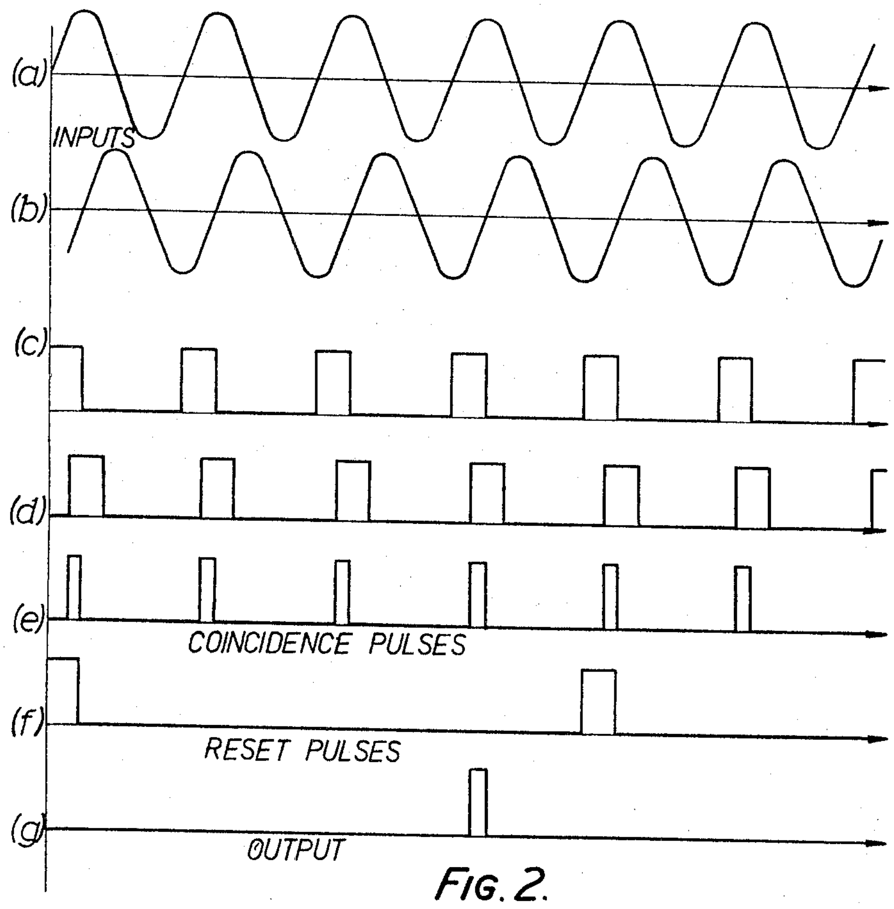

These input current waveforms are shown at (*a*) and (*b*) in FIGURE 2.

The two input wave forms are applied to pulse shaping circuits 12 and 13 respectively each of which, for example, may take the form of a monostable circuit of well known form which produces from each sinusoidal input wave form a train of square pulses of fixed duration and having a fixed relationship with the sinusoidal inputs. The wave forms shown in FIGURE 2 correspond to a typical case in which the leading edge of each pulse in pulse trains (*c*) and (*d*) from the pulse shaping circuits corresponds to the point at which the sinusoidal input wave form crosses the zero axis in a given direction.

The two pulse trains derived from the pulse shaping circuits are applied to an AND gate or coincidence gate 14 of well known form, which delivers an output pulse only when supplied with coinciding or overlapping pulses at its respective inputs. The output pulse from the AND gate is applied to a "scale or three" frequency divider or scaler 15 comprising a simple counting circuit of well-known form delivering an output pulse on line 16 for every three input pulses applied to it from the AND gate 14.

A further frequency divider or scaler device 16 of well known form, counting in a scale of four, is supplied with input pulses from one pulse shaping circuit 13 and delivers a reset pulse over line 17 to the scale of three 15 for every four input pulses applied to it from the pulse shaping circuit. A reset pulse on line 17 which sets the scale of three 15 to its initial or zero count state irrespective of the count in the scale of three.

The operation of the apparatus is best understood by considering for a particular case the wave forms shown in FIGURE 2. For the purpose of this explanation it is assumed that the input lines 10 and 11 carry sinusoidal currents of exactly equal frequency but having a small phase difference. The pulse shaping circuits 12 and 13 produce from the sinusoidal inputs (*a*) and (*b*) the respective pulse trains (*c*) and (*d*). The duration of the pulses in the two pulse trains is identical and such that if the two sinusoidal input signals are in phase synchronism within the predetermined limits set by the apparatus two pulses overlap in time, so that the two inputs of the AND gate 14 have periodic intervals of simultaneous energisation. The output from the AND gate 14 is thus a further pulse train (*e*) of the same repetition frequency as each of the input pulse trains but differing from them in that the pulse width corresponds to the overlapping intervals of the two input pulse trains. The coincidence pulse train (*e*) is applied to the scale of three 15 which delivers an output pulse (*g*) for every three input pulses applied to it from the AND gate.

Pulse train (*d*) derived from the pulse shaping circuit 13 is also applied to the input of the scale of four, 16, which delivers its output pulse on line 17, as shown at (*f*), in correspondence with every fourth input pulse applied to it from the pulse shaping circuit. This pulse is used to reset the scale of three to its zero condition. It is assumed that the effect of the reset pulse on line 17 over-rides the simultaneous input pulse applied to the scale of three 15 from the AND gate 14.

So long as the two input signals are in phase and frequency synchronism within the predetermined limits, the scale of three 15 will cycle regularly up to its maximum count and will then be reset to zero. The scale of three 15 is a cycling counter and the resetting operation would automatically follow on the third input pulse irrespective of the state of reset line 17, which in these conditions effectively inhibits the next successive input pulse and delays the beginning of a new count of the scale of three.

The defined limits of frequency and phase synchronism are determined by the fixed widths of the pulses of pulse train (*c*) and (*d*). In FIGURE 2 it is assumed that a phase error of approximately 90 electrical degrees is allowable, enabling the operation of the device to be clearly shown. In practice much smaller values of phase error would be permissable.

It will be seen that if the phase error exceeds the limit determined by the duration of the input pulses, with the two input signals of the same frequency, two incident pulses will never occur at the input of AND gate 14 and the scale of three 15 will remain in its zero count state. Two coincident input pulses will occur at periodical intervals at the input of AND gate 14, producing stopping of the scale of three counter 15, but unless three pairs of coincident pulses occur successively the scale of three 15 will be reset by a pulse delivered from scale of four 16 over line 17 before it reaches its maximum count condition and will therefore be prevented from delivering an output pulse.

The output wave form (*g*) delivered over line 16 is thus a pulse train of frequency one-quarter of that of the input wave forms and occurring only when the input wave forms are in frequency and phase synchronism within the defined limits for at least three successive cycles. This output may be used to energise an indicator or may be employed directly to close a contactor or its equivalent for parallelling a pair of associated generators supplying the input wave form on lines 10 and 11.

What we claim is:

1. Apparatus for the frequency and phase comparison of two periodic input signals including means for producing two pulse trains, each corresponding in frequency and phase to one of the periodic input signals, the pulses of the two pulse trains having the same fixed duration irrespective of the periodic time of the periodic input signals, a coincidence gate to which the two pulse trains are applied and which produces an output pulse whenever a pulse in one pulse train overlaps a pulse in the other pulse train, a first frequency divider circuit to which the said output pulse is fed, the first frequency divider circuit to which the said output pulse is fed, the first frequency divider circuit delivering an output pulse whenever it reaches a position corresponding to its maximum stored count and capable of being reset to its initial or zero count by means of a reset pulse, and a second frequency divider circuit having a division factor greater than that of the first frequency divider circuit, said second frequency divider circuit being fed from one of said pulse trains to produce a reset pulse for resetting the first frequency divider circuit.

2. Apparatus as recited in claim 1, wherein each of said pulse train producing means includes a pulse shaping circuit for producing a train of square pulses of predetermined duration.

3. Apparatus as recited in claim 1, wherein said first frequency divider reaches a position corresponding to its maximum stored count upon the application of three successive coincidence pulses derived from the coincidence gate.

4. Apparatus as claimed in claim 3, wherein said second frequency divider produces a reset pulse upon the application thereto of every fourth pulses of one of said pulse trains.

References Cited

UNITED STATES PATENTS

| | | | |
|---|---|---|---|
| 2,863,117 | 12/1958 | Graustein | 324—82 X |
| 3,187,262 | 6/1965 | Crane | 324—82 X |
| 3,206,684 | 9/1965 | Der et al. | |
| 3,217,326 | 11/1965 | Kaufman et al. | 324—85 X |

ROBERT K. SCHAEFER, *Primary Examiner.*

T. B. JOIKE, *Assistant Examiner.*

U.S. Cl. X.R.

340—147, 170, 171; 328—133; 324—82